Patented Mar. 14, 1933

1,900,995

UNITED STATES PATENT OFFICE

MARION F. NICHOLS, OF KNOXVILLE, TENNESSEE, ASSIGNOR OF ONE-HALF TO CAMPBELL WALLACE, OF KNOXVILLE, TENNESSEE

METHOD OF TREATING LIQUIDS

No Drawing.   Application filed June 9, 1931.   Serial No. 543,246.

My invention relates to a method of treating liquids, such as waste products from tanneries, tannic extract plants, textile mills, hosiery mills, knitting mills, and water containing coloring matter or silt, to render the same suitable to be discharged into streams, or for desired use.

An important object of the invention is to provide a method for treating the waste products from tanneries, tannic extract plants, hosiery mills, or the like, so that the same is rendered clear and transparent, and may be discharged into streams without liability of discoloring the same, or polluting them.

A further object of the invention is to provide a method for treating water containing coloring matter and silt, so that the same is rendered clear and transparent and sterilized, so that it may be used for any desired purpose.

The waste products from tanneries usually comprise the following substances:

1. The green waste water from the soaking of the green hides in vats.
2. The green wash water from washing the green hides after the soaking operation.
3. The old slaked lime liquor from the vats in which the hides are limed for the purpose of removing the epidermis and loosening the hair follicles.
4. The waste slaked lime sediment from the lime treating vats, including slaked lime and hide substance.
5. The waste liquor from the white hide wash.
6. The waste liquor from the bate pool.
7. The waste liquor from the handler or rocker vats, which liquors have become too weak in tanning materials and are discarded for that reason.
8. The waste liquors from the alkali vat containing soda ash and from the acid vat containing sulphuric acid, in which the tanned hide is introduced for causing the same to be bleached, there being usually about equal parts of the alkali liquor and the acid liquor.

The above referred to waste products, varying greatly as to chemical composition, for successful treatment, must be combined in a proper manner. In the practice of my method, these waste liquors are combined to form three groups, A, B, and C. The waste products constituting each group are introduced into a separate vat, well agitated, and allowed to stand for complete re-action.

Group A comprises the following waste products.

1. The green waste water from the soaking of the green hides in vats.
2. The green wash water from washing the green hides after the soaking operation.
8. The waste liquor from the alkali vat and the waste liquor from the acid vat, the same being usually present in about equal parts.

To these combined solutions, sufficient sulphuric acid is added to break up the sulphides present, liberating hydrogen sulphide gas, which is removed by suitable agitation. The sulphuric acid is added, as above indicated, as the acid contained in the waste solution from the acid vat, is not ordinarily sufficiently strong to effect the proper chemical re-action to break up all the sulphides. The amount of sulphuric acid to be added depends upon the alkalinity of group A, and when the sulphuric acid is added, a test is made with litmus, and when such test shows a slightly acid re-action, a proper amount of sulphuric acid has been added.

Group B contains the following waste products:

7. The waste liquor from the handler or rocker vats, which have become too weak in tanning material.
4. The waste lime sediment from the lime treating vats, including lime and hide substances. The waste lime sediment is added to combine with the tannic, the gallic and other organic acids present to completely re-act with the same to form lime salts.

Group C comprises the following waste products:

5. The waste liquor from the white hide wash containing a small amount of lime.
6. The waste liquor from the bate pool, also containing a small amount of lime.
3. The old lime liquor from the vats in which the hides are limed.

The group solutions A, B, and C, produced as described, are now introduced into a single vat and allowed to stand so that the solid materials settle out.

The liquor having fine particles in suspension which do not settle out, is now withdrawn from the vat and from the presence of the sediment for further clarification and de-colorization. In some instances, it is desirable to add to the liquor, at this time, a small amount of a solution of green hide fleshings, or similar material which aids in de-coloring the solution. The liquid mass is now suitably agitated. The liquor, with or without the added solution of green hide fleshings, is now treated by adding thereto calcium acid phosphate, powdered talc, finely ground clay and iron salt, such as iron sulphate or iron chloride. After the addition of these products to the liquor, the liquor is tested to determine its alkalinity. It is desired that the liquor thus treated have an alkalinity of a pH reading of about 7 to 9, and if it does not have the desired alkalinity, sufficient alkali, such as calcium oxide or calcium hydroxide is added to bring the alkalinity up to a pH reading of about 7 to 9, as stated. The calcium acid phosphate re-acts with the alkali, producing a floc which absorbs the fine particles in suspension and coloring matter and serves to drag them down in the formation of a sediment. The powdered talc and clay introduced, aid the floc in dragging down the fine particles, by settlement, while the iron salt, having an acid re-action, re-acts with the lime present to produce a floc, which serves to drag down the fine particles in suspension. Some degree of success may be had by using calcium acid phosphate alone for this purpose. Due to the fact that the chemical constituents of the resultant solution materially varies, no definite proportion of the calcium acid phosphate and the iron salt can be stated, as it must be determined by actual tests. As soon as the calcium acid phosphate is added, if there is a suitable amount of lime present in the solution, a floc is at once produced, which serves to drag down the fine particles of the solution in suspension, therein, thereby clarifying the solution, and if the floc is not immediately produced upon the addition of the calcium acid phosphate, lime must be added in sufficient amounts to impart to the solution the desired degree of alkalinity, as stated, to completely re-act with the calcium acid phosphate for producing the floc, the calcium acid phosphate and the lime being added in suitable amounts for producing the floc, until the solution becomes entirely clear. The amount of clay and talc added may be widely varied, as these are neutral substances, and they may be used in practically any amounts.

After the solution has been thus treated, it is allowed to completely settle and it will be found that the same will be perfectly clear of particles in suspension and free from coloring matter. The clear liquor is now withdrawn from the presence of the sediment. This liquor may now be sterilized by the use of chlorine gas and may be run into streams without liability of discoloring the same or injury to animal life.

Tannic extract plants produce waste products which, when run into streams, discolor and pollute the same. The waste products of tannic extract plants comprise the following product:

1. A liquor comprising tannic acid and gallic acid and other organic acids.

In treating this waste liquor, an alkali, such as calcium oxide or calcium hydroxide is added until a neutral re-action is obtained. The added alkali will precipitate the salts of the tannic and gallic acids, which will settle to the bottom, and neutralize the other organic acids present, such as acetic acid. This solution which has fine particles in suspension and also has a coloring matter present, is now separated from the settled precipitate, and is further treated to render the same clear and transparent. The liquor is now tested for its alkalinity and a further amount of alkali added, such as calcium oxide or calcium hydroxide, to bring its alkalinity up to a pH reading of from about 7 to 9. Calcium acid phosphate is now added to the liquor thus treated and re-acts with the alkali to produce a floc which combines with the fine particles in suspension and the coloring matter, causing the same to settle to the bottom of the liquid with the floc. The liquid thus produced is free from fine particles in suspension and is transparent and is now separated from the settled floc and may be sterilized by chlorine gas, after which it may be introduced into streams without liability of discoloring or polluting the same.

Textile mills, hosiery mills, knitting mills, etc., also produce considerable waste liquors comprising wash waters, soapy material, dyes, bleaching materials, etc., which, when run into streams, discolor the water, and when allowed to collect in pools, soon decompose and give off offensive odors. I have found that these waste liquors, which are usually alkaline or slightly acid, may be suitably treated to clarify and purify the same.

To accomplish this, the waste liquors are collected in a suitable tank, into which a sufficient quantity of calcium acid phosphate is first added and the mass thoroughly agitated, subsequently to which sufficient alkali, either calcium oxide or calcium hydroxide is added, to bring the alkalinity of the liquor up to pH reading of about 7 to 9, so that the re-action of the calcium acid phosphate with the alkali will cause a heavy flocculation, which readily absorbs the dark coloring matter and fine particles in suspension, from the waste liquor treated, causing the same to settle to the bottom of the tank with the flocs. The degree of clarification depends upon the quantity of calcium acid phosphate and the quantity of alkali added. The flocculation may be continued until the waste liquor is rendered entirely clear, the clear liquor being then separated from the sediment. The clear liquor may be sterilized by treatment of chlorine gas, whereby it may be discharged into streams without liability of discoloring the same, or injury to animal life.

I have also discovered that calcium acid phosphate may be advantageously employed in the treatment of water containing considerable organic coloring matter and fine silt, such as water derived from ordinary streams, prior to being supplied to textile mills, knitting mills, and municipal water plants, and the like. The water containing the organic coloring matter and fine silt is treated by adding calcium acid phosphate thereto, and thoroughly agitating. An alkali, either calcium oxide or calcium hydroxide is then added to this water in a sufficient amount to impart to the same an alkalinity of a pH reading from about 7 to 9. Upon the addition of the lime, the calcium acid phosphate re-acts therewith and produces a heavy floc, which readily settles to the bottom of the tank containing the water, and drags down with it the coloring matter and fine silt. The amount of calcium acid phosphate and the corresponding amount of lime, which must be added to the water to completely clarify the same, varies in each particular case, and the same are continued to be added so that the flocculation continues until the water is entirely clarified. The water thus treated is allowed to completely settle and the clear water is withdrawn from the presence of the flocs. This clear water may be sterilized by the use of chlorine gas, if desired. The clear water thus treated may now be used for any desired purpose, as it is perfectly clear and completely sterilized.

Having described by invention, what I claim is:

1. The method of treating the waste products from tanneries to clarify and purify the same, comprising combining the green waste water from the soaking of the green hides in vats, the green wash water from washing the green hides after the soaking operation, and waste liquor from the alkali vat and the waste liquor from the acid vat to produce a liquid mass adding to this liquid mass sufficient sulphuric acid to break up the sulphides present, thereby liberating hyrogen sulphide gas; removing the hydrogen sulphide gas by agitation of the liquid mass: combining the waste liquor from the handler or rocker vats, and the waste lime sediment from the lime treating vats to produce a second liquid mass: combining the waste liquor from the white hide wash, the waste liquor from the bate pool, and the old lime liquor from the vats in which the hides are limed to produce a third liquid mass: combining the three liquid masses and allowing the same to stand so that the solid material settles out: withdrawing the liquor having fine particles in suspension from the presence of the sediment: adding to the liquor a small amount of a solution of green hide fleshings to aid in de-coloring the same: adding to the liquor thus obtained calcium acid phosphate in the presence of an alkali for producing a floc which combines with the fine particles in suspension in the liquor and settles with them: and separating the liquid thus obtained from the sediment produced.

2. The method of treating waste products from tanneries to clarify and purify the same, comprising combining the green waste water from the soaking of the green hides in vats, the green wash water from the green hides after the soaking operation, and waste liquor from the alkali vat and the waste liquor from the acid vat to produce a liquid mass adding to the liquid mass sufficient sulphuric acid to break up the sulphide present and thereby liberate hydrogen sulphide gas; agitating the liquid mass to remove the hydrogen sulphide gas; combining the waste liquor from the handler or rocker vats, and the waste lime sediment from the lime treating vats to produce a second mass: combining the waste liquor from the white hide wash, the waste liquor from the bate pool, and the old lime liquor from the vats in which the hides are limed to produce a third mass: combining the three masses and allowing the same to stand so that the available solid material settles out: withdrawing the liquor having fine particles in suspension from the presence of the sediment: adding to the liquor thus obtained calcium acid phosphate in the presence of an alkali for producing a floc which combines with the fine particles in suspension in the liquor and settles with them: and separating the liquid thus obtained from the sediment produced.

3. The method of treating waste products from tanneries to clarify and purify the same, comprising combining the green waste water from the soaking of the green hides in vats, the green wash water from the green hides after the soaking operation, the waste liquor from the alkali vat and the waste liquor from the acid vat, and added sulphuric acid to break up the sulphides present, the same producing a liquid mass: combining the waste liquor from the handler or rocker vats, and the waste lime sediment from the lime treating vats to produce a second mass: combining the waste liquor from the white hide wash, the waste liquor from the bate pool, and the old lime liquor from the vats in which the hides are limed, to produce a third mass: combining the three masses and allowing the same to stand so that the available solid material settles out: withdrawing the liquor having fine particles in suspension from the presence of the sediment: adding to the liquor thus obtained calcium acid phosphate, powdered talc, finely ground clay and an iron salt: adding to the mass an alkali to impart to the same a desired alkalinity, the calcium acid phosphate and the iron salt re-acting with the added alkali to produce a floc which combines with the suspended particles and settles with them, the talc and clay also aiding in settling the fine particles: separating the liquor from the sediment thus produced: and sterilizing the liquor thus obtained.

4. In the method of treating waste products from tanneries to clarify and purify the same, comprising treating the waste products containing sulphides with sulphuric acid and producing a mass, a sufficient amount of sulphuric acid being added to break up the sulphides present and liberate hydrogen sulphide gas: agitating the liquid mass to remove the hydrogen sulphide gas: treating the waste products containing tannic, gallic and other organic acids with the waste lime sediment to form lime salts and producing a second mass: combining the remaining waste products containing lime: combining the masses thus produced for providing a liquid mass: adding to the liquid mass calcium acid phosphate: adding to the mass thus produced an alkali, the calcium acid phosphate re-acting with the alkali to produce a floc which combines with the fine particles in suspension and settles with the same: and separating the liquid from the sediment thus produced.

In testimony whereof I affix my signature.

MARION F. NICHOLS.